United States Patent [19]
Orlandi et al.

[11] Patent Number: 4,934,938
[45] Date of Patent: Jun. 19, 1990

[54] FOOTBALL TRAINING DUMMY

[76] Inventors: Marcello Orlandi, Via Borzi, 1/A; Franco Verani, Via Spaventa, 19; Giuseppe Mastalli, Via Amendola, 19, all of 57023 Cecina, Italy

[21] Appl. No.: 179,513

[22] Filed: Apr. 8, 1988

[30] Foreign Application Priority Data

Apr. 9, 1987 [IT] Italy .................. 4830/87[U]

[51] Int. Cl.⁵ .................. A63B 67/00; G09B 19/00
[52] U.S. Cl. .................. 434/251; 273/55 A
[58] Field of Search .................. 434/251, 247, 255; 273/55 A, 55 R, 411; 446/97; 272/102

[56] References Cited

U.S. PATENT DOCUMENTS

| | | | |
|---|---|---|---|
| 1,663,659 | 8/1925 | Hart et al. | 273/55 A |
| 1,884,816 | 11/1930 | Oakes | 273/55 A |
| 2,846,809 | 8/1958 | Majewski | 446/97 |
| 3,304,089 | 2/1967 | Smith | 273/55 R |
| 3,422,565 | 1/1969 | Kentfield et al. | 446/97 |
| 3,469,339 | 9/1969 | Thomas | 446/97 |

Primary Examiner—Edward M. Coven
Assistant Examiner—Valerie Szczepanik
Attorney, Agent, or Firm—Michael N. Meller

[57] ABSTRACT

A silhouette dummy of generally human form, particularly for the training of football players has a substantially rigid base element supporting a flexible structure formed from plastic tubular material, and spikes designed to stick into the ground.

7 Claims, 1 Drawing Sheet

FOOTBALL TRAINING DUMMY

BACKGROUND OF THE INVENTION

The present invention relates to a silhouette dummy of human form, particularly suitable for certain types of training in football or other sports, such as rugby.

For certain football training exercises, wooden dummies are currently used and are supported substantially vertically on a wooden support at an angle in relation to the dummy itself. For in-field training, a number of metal dummies supported on a trestle are employed for simulating a barrier for penalty kicks.

Dummies of both the aforementioned types present a number of drawbacks.

In particular, they are extremely heavy and, therefore, difficult to move about and set up on the field. Furthermore, being of rigid design, they are easily knocked down by the ball, thus resulting in severe wear and downtime for setting them up again. For certain types of training exercises, the dummies must be set out singly in a given pattern, which, of course, is impossible in the case of trestle-mounted metal types, and also in the case of wooden types, which are extremely cumbersome at the base, especially on account of the type of support employed.

SUMMARY OF THE INVENTION

The aim of the present invention is to provide a silhouette dummy of human form involving none of the aforementioned drawbacks, i.e. which is lightweight, easy to set up, and springs back up automatically when struck by the ball.

BRIEF DESCRIPTION OF THE DRAWINGS

Further aims and advantages will be revealed in the following description relative to a preferred non-limiting embodiment of the present invention and with reference to the accompanying drawings, in which.

DETAILED DESCRIPTION OF THE INVENTION

Figure 1:
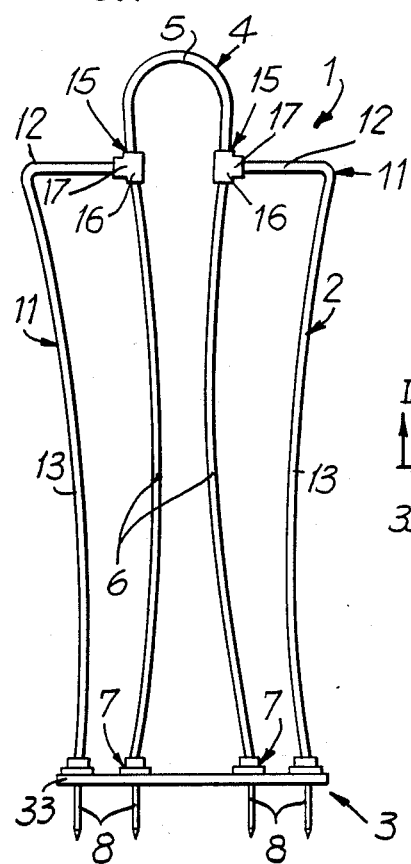
FIG. 1 shows a front view of a dummy in accordance with the teachings of the present invention.

Number 1 in FIG. 1 indicates a dummy of human form comprising a structure 2 formed from plastic material, and spiked means 3 designed to stick into the ground and support the structure 2 substantially vertically. The structure 2 comprises a first tube 4 bent in the form of an inverted U and, therefore, presenting a bend portion 5 describing a curved trajectory, and two arms 6, each end of which is fitted, by means of a joint 7, with a spike 8 designed to stick into the ground.

At the top of each arm 6, just below the portion 5, there are fitted tubes 11, each tube 11 being bent in the form of an inverted L and, therefore, presenting a short, substantially horizontal portion 12, and a substantially vertical portion 13, the bottom end of which is fitted with a spike 8 by means of a further joint 7. The portion 5 of tube 4 simulates the head of the human form represented by dummy 1, portions 12 of tubes 11 simulate the shoulders, and portions 13 simulate the sides.

As shown in FIG. 1, tubes 11 are connected to tube 4 by means of two T joints 15, each presenting a sleeve coupling 16 fitted over tube 4 and secured conveniently thereto. From coupling 16, there extends perpendicularly a coupling 17 integrally housing the end of the portion 12 of tube 11. As already stated, the tubes 4 and 11 are formed from plastic material. Therefore, by also forming joints 15 from plastic material, the above connections may be made by welding.

Figure 2:
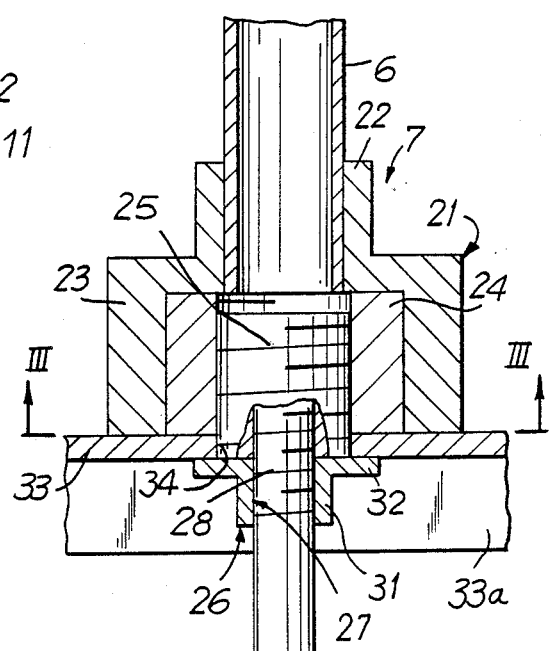
FIG. 2 shows a section of a detail on the FIG. 1 dummy.
Figure 3:
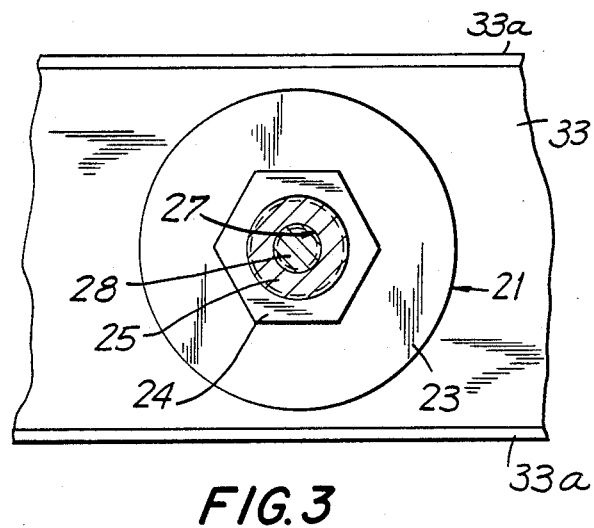
FIG. 3 shows a section along line III—III in FIG. 2.

As shown in FIGS. 2 and 3, joint 7 comprises a plastic coupling 21 having a top portion 22, the inside of which is secured, e.g. by welding, to the bottom end of arm 6 or portion 13. A bottom portion 23 is faceted for housing an internally threaded, externally faceted metal coupling 24. Inside the metal coupling 24, there is screwed the threaded portion 25 of a metal element 26 connecting joint 7 and spike 8, for which purpose, element 26 has a threaded axial hole 27 inside which is screwed the threaded end 28 of spike 8. The element 26 also has an externally faceted bottom portion 31 gripped by a tool (not shown) for screwing portion 25 into coupling 24. Between portions 25 and 31 of element 26, there is formed an annular flange 32 for enabling a horizontal metal plate 33 to be gripped between joint 7 and respective element 26. The plate 33 has four spaced through holes 34, each fitted through with portion 25 of respective element 26, so that grip is exerted along the edge of holes 34. The mutual position of the holes 34 enables correct positioning of the ends of tubes 4 and 11. In particular, the ends of tube 4 are gripped in the center portion of plate 33, and the ends of tubes 11 are gripped to the side of the same. Between the ends of tubes 6, sufficient space is allowed for enabling the operator to insert his foot for pressing down on plate 33 and so sticking spikes 8 into the ground. As shown in FIG. 2, the side edges 33a of plate 33 are turned down at right-angles, so that elements 26 are contained within the space defined by side edges 33a.

The advantages of the present invention will be clear from the foregoing description.

Firstly, by virtue of the structure 2 of dummy 1 being formed from plastic, i.e. flexible, material, instead of being knocked down by the ball, the structure 2 merely sways and springs back automatically into the vertical position. This and the fact that the plastic material is unaffected by rain, frost or corrosive agents, eliminates wear and considerably extends the working life of dummy 1. Furthermore, it is lightweight, easy to carry, and may be positioned easily anywhere on the field, either singly or in conjunction with other dummies, by simply applying foot pressure on the center portion of plate 33 and sticking spikes 8 into the ground. By virtue of the straightforward design of dummy 1 and easy assembly of the means supporting structure 2, dummy 1 is also very cheap to produce.

To those skilled in the art it will be clear that changes may be made to dummy 1 as described and illustrated herein without, however, departing from the scope of the present invention.

In particular, connection of structure 2 and spikes 8 may be other than as described herein. For example, structure 2 may be supported on a plate similar to plate 33 but having a number of spikes designed to stick into the ground.

We claim:

1. A silhouette dummy of generally human form, particularly for the training of football players, comprising a base element; a vertical structure extending from the base element upwards, and rigidly connected thereto; and a number of spikes extending from the base element downwards, for direct insertion into the ground to secure the base element to the ground; the vertical structure comprising first, second and third tubes, said first and second tubes being each rigidly connected at one end thereof to the base element and said third tube being rigidly connected at both ends thereof to the base element; first joint means being provided to connect the other end of each of said first and second tubes to said third tube; and each of said tubes being nonlinear and made of flexible material.

2. A dummy as in claim 1, wherein said third tube is shaped as an inverted U; and said first and second tubes arranged on opposite sides of said third tube are each shaped as an inverted L; the third tube being bent to comprise an intermediate substantially horizontal curved upper portion, and two substantially vertical lower portions extending from the base element; and each of said first and second tubes being bent to comprise a substantially horizontal upper portion and a substantially vertical lower portion extending from the base element, said first joint means being interposed between the upper portion of each of said first and second tubes and an adjacent lower portion of said third tube, and second joint means being provided for rigidly connecting each of said lower tube portions to the base element.

3. A dummy as in claim 2, where said spikes are equal in number to, and substantially coaxial with, said lower tube portions.

4. A dummy as in claim 3, wherein each of said second joint means comprises screw means extending through the base element, and upper bolt means engaged by said screw means and rigidly connected to a lower end of a respective one of said lower tube portions.

5. A dummy as in claim 4, wherein each of said screw means is tubular in shape, and is provided with a threaded hole; and each spike has an upper threaded portion for engaging a respective one of said threaded holes.

6. A silhouette dummy of generally human outline, comprising a substantially rigid base element having two sides, an interconnected array of substantially flexible tubular members extending from one side of said base element and secured thereto at a plurality of locations, said locations being arranged in a substantially linear row on said base element, and a plurality of spikes extending from the other side of said base element and secured thereto, said array of tubular members comprising first, second and third tubular members each having first and second ends, said first ends of said first and second tubular members being rigidly connected to said base element, said first and second ends of said third tubular member being rigidly connected to said base element, and said second ends of said first and second tubular members being rigidly connected to said third tube.

7. A silhouette dummy of generally human form, particularly for the training of football players, comprising a base element; a vertical structure extending from the base element upwards, and rigidly connected thereto; and a number of spikes extending from the base element downwards for direct insertion into the ground to secure the base element to the ground; the vertical structure comprising a number of tubes, each rigidly connected to the base element; first joint means being provided to connect each of said tubes to another of said tubes; and each of said tubes being made of flexible material, and comprising at least two adjacent portions extending in two different directions arranged at an angle to each other, wherein the vertical structure comprises an intermediate first tube, which is shaped as an inverted U; and two lateral second tubes arranged on opposite sides of the first tube, and each shaped as an inverted L; the first tube being bent to comprise an intermediate substantially horizontal curved upper portion, and two substantially vertical lower portions extending from the base element; and each second tube being bent to comprise a substantially horizontal upper portion and a substantially verticle lower portion extending from the base element, said first joint means being interposed between the upper portion of each second tube and an adjacent lower portion of the first tube, and second joint means being provided for rigidly connecting each of said lower tube portions to the base element.

* * * * *